United States Patent

Caviezel et al.

[11] Patent Number: 5,984,004
[45] Date of Patent: Nov. 16, 1999

[54] METHOD AND AN ARRANGEMENT FOR COOLING OR HEATING A MACHINE CASING

[75] Inventors: Thorsten Caviezel, CH-Ormalingen; Raphael Deschler, CH-Bubendorf; Patrick Tschopp, CH-Kaiseraugst, all of Switzerland

[73] Assignee: Buss AG, Pratteln, Switzerland

[21] Appl. No.: 08/902,280

[22] Filed: Jul. 29, 1997

[30] Foreign Application Priority Data

Aug. 12, 1996 [CH] Switzerland .................. 1996 1973/96

[51] Int. Cl.[6] .............................. F28F 27/00; F28F 27/02; F24F 3/14; F25B 37/00
[52] U.S. Cl. .............................. 165/276; 165/60; 165/61; 165/260; 165/265; 165/294
[58] Field of Search ................. 165/276, 60, 61, 165/260, 265, 294, 157

[56] References Cited

U.S. PATENT DOCUMENTS 4,552,303  11/1985  Fisher et al. .................. 165/276 X
4,676,300   6/1987  Miyazaki ...................... 165/276

*Primary Examiner*—Ira S. Lazarus
*Assistant Examiner*—Lance W. Chandler
*Attorney, Agent, or Firm*—Tarolli, Sundheim, Covell, Tummino & Szabo

[57] ABSTRACT

For cooling and/or heating a machine casing, a method and an arrangement is disclosed in which the machine casing is provided with cooling channels in which pipes are received. Between the pipes and the walls of the cooling channels, a cavity remains through which a cooling medium is circulated. A liquid heat exchange medium is circulated through the pipes. In order to vary the heat energy exchanged per time unit between the pipes and the machine casing, the kind of the medium circulating in the cavities is changed, or its composition is changed, or the flow velocity of the heat exchange medium is varied, or any desired combination of the above measures is realized. Thus, the heat flow, i.e. the exchange of heat energy per time unit, can easily be influenced by the provision of cavities between machine casing and heating or cooling medium by controlling its limiting heat exchange factors, i.e. thermal conductivity and heat transfer resistance.

30 Claims, 3 Drawing Sheets

METHOD AND AN ARRANGEMENT FOR COOLING OR HEATING A MACHINE CASING

FIELD OF THE INVENTION

The present invention refers to a method for cooling or heating a machine casing with a process chamber enclosed by the casing and adapted to receive a material to be treated therein, whereby the temperature of the material to be treated has to be kept essentially constant. The casing comprises a plurality of channels located in its interior and delimited by channel walls, and a plurality of pipes adapted to receive a liquid cooling or heating medium circulating therethrough.

Each pipe of the plurality of pipes is received in one of the channels such that at most a portion of the surface of the pipes is in thermal contact with the channel walls of the associated channel, whereby a cavity is provided between each of the channel walls and the pipe surface of the pipe located in that particular channel.

Moreover, the present invention refers to an arrangement for cooling or heating a machine casing of the kind referred to herein above.

In order to explain the problems associated with the cooling or heating of such machine casings, the particular case of a mixing and kneading apparatus is chosen as an example. The temperatures at which the materials are treated in the process chamber of a mixing and kneading apparatus can vary within wide limits and are dependent of the particular material and the treating process performed in the mixing and kneading apparatus. For example polyether ether ketone (PEEK) has to be processed at a temperature of appr. 380–400° C., while other plastic materials, like for instance polyethylene, have to be processed at a temperature of appr. 120 to 160° C. These temperatures must be kept as constant as possible during the processing of the material. In order to heat the mixing and kneading apparatus to a temperature required for processing the particular material, a heating arrangement must be provided. On the other hand, the mixing and kneading apparatuses have to comprise a cooling arrangement, because mechanical energy is introduced which causes a rise of the temperature of the material, or because an exoergic process takes place; i.e. heat energy has to be drawn off the material in order to keep the temperature of the material to be processed at a constant level.

Moreover, in many cases, e.g. at the end of processing a particular batch or for having the possibility to do some servicing of the apparatus, it is desired to cool down the apparatus as soon as possible. The real difficulty may be seen in the fact that a cooling system adapted to keep the temperature of the apparatus at a level of e.g. 140° C. must be designed completely differently from a cooling system adapted to keep the temperature of the apparatus at a level of e.g. 350° C.

Furthermore, the field of application of a particular mixing and kneading apparatus is often not yet known and the materials to be treated in that particular apparatus differ during the practical life span of the apparatus; the result is that usually a cooling system must be provided which covers a broad field of applications. Inevitably, such a cooling system constitutes a compromise since the cooling systems known in the prior art operate optimally only within a relatively narrow range of temperatures.

PRIOR ART

The problems arising in connection with the cooling of hot casings are discussed in detail in the document EP 0 548 021. The mentioned EP document discloses a cooling device which has a casing and a processing chamber enclosed by the casing as well as a rotating and/or oscillating working member received in the processing chamber. For cooling the processing chamber and the material to be treated, respectively, the casing is provided with cooling channels. In the channels, a plurality of hollow tube members are received. The hollow tube members are adapted to receive a cooling medium and are at most with a part of their surface in direct thermal contact with the wall portions of the cooling channels. By this design, the heat transfer between casing and cooling medium is limited, with the result that water can be used as the cooling medium, even under such circumstances when the reaction process in the processing chamber takes places at temperatures of 200° C. or more.

Despite the fact that such cooling devices have been proven reliable in practice, it would be most desirable to vary the cooling performance within wider limits.

Moreover, it would be desired that the machine casing could be manufactured in a more or less standardized manner, i.e. independently from the question, at what temperatures the reaction processes will take place in future use of such a machine.

OBJECTS OF THE INVENTION

It is an object of the present invention to provide a method for cooling or heating a machine casing by means of which a desired process temperature can be maintained with greatly increased accuracy.

It is a still further object of the present invention to provide a method for cooling or heating a machine casing by means of which an effective cooling or heating of a casing can be realized within a wide spectrum of temperatures.

It is a still further object of the present invention to provide a method for cooling or heating a machine casing by means of which a desired temperature change of the machine casing can be realized very quickly and efficiently.

It is a still further object of the present invention to provide a method for cooling or heating a machine casing which can be performed independently of the kind of the reaction process taking place in the machine at low costs.

Finally, it is an object of the present invention to provide an arrangement for cooling or heating a machine casing which is well suited to perform the method according to the invention, having all the above objects in mind.

SUMMARY OF THE INVENTION

To meet these and other objects, the present invention provides, according to a first aspect, a method for cooling or heating a machine casing having a process chamber enclosed by the casing and adapted to receive a material to be treated therein, whereby a desired temperature of the material to be treated in the process chamber has to be kept essentially constant.

A plurality of channels are located in the interior of the casing, and a plurality of pipes adapted to receive a liquid cooling or heating medium and circulating therethrough is received in the channels such that at most a portion of the surface of each of the pipes is in thermal contact with the channel walls. A cavity is provided between each of the channel walls and the pipe surfaces.

In operation, a heat exchange medium is conveyed through the cavities to exchange heat between the pipes and the channel walls, whereby the amount of heat energy exchanged per time period between the pipes and the channel walls is varied either (i) by replacing the heat exchange medium by a different heat exchange medium or (ii) by changing the composition of the heat exchange medium or (iii) by adjusting the flow velocity of the heat exchange medium or by any desired combination of the steps (i) to (iii) to keep the temperature of the material to be treated in the process chamber essentially constant.

Thus, the method of the present invention is based on the fact that two separate cooling or heating circuits are maintained in the machine casing to be cooled or heated. The first circuit is constituted by the liquid circulating in the pipes, while the second circuit is constituted by the heat exchange medium circulating in the cavities between the pipes and the channel walls. In order to adjust the heat exchange performance between the liquid circulating in the pipes and the machine casing, the kind of the heat exchange medium and/or its composition and/or its flow velocity is changed and varied, respectively. In this way, it is possible to influence the temperature of the machine casing in any desired manner within a very broad temperature spectrum.

A further advantage of the method according to the invention lies in the fact that the machine casing is cooled or heated very homogeneously, because a continuous heat exchange between the medium circulating in the cavities and the liquid circulating in the pipes takes place within the entire machine casing. Tests have shown that the difference in temperature of the liquid between inlet of the pipes and outlet of the pipes is very small. As a still further advantage can be mentioned that the inlet temperature of a gaseous heat exchange medium circulating in the above mentioned cavities is of only minor importance, because the temperature of the gaseous medium stabilizes very quickly after it has entered the cavities, due to the continuous heat exchange between the two heat exchange media. This is particularly true if a turbulent flow is created in the cavities, as is proposed in a preferred embodiment.

According to a further preferred embodiment, a liquid is admixed to the gaseous medium circulating in the cavities. This measure has the effect that the amount of heat energy exchanged per time unit between the pipes and the machine casing is instantly increased.

According to a second aspect, the present invention provides an arrangement for cooling or heating a machine casing having a process chamber enclosed by the casing and adapted to receive a material to be treated therein, whereby a desired temperature of the material to be treated in the process chamber has to be kept essentially constant.

A plurality of channels are located in the interior of the casing, and a plurality of pipes adapted to receive a liquid cooling or heating medium and circulating therethrough is received in the channels such that at most a portion of the surface of each of the pipes is in thermal contact with the channel walls. A cavity is provided between each of the channel walls and the pipe surfaces.

The arrangement further comprises means for conveying the heat exchange medium through the cavities to exchange heat between the pipes and the channel walls and means for varying the amount of heat energy exchanged per time period between the pipes and the channel walls by the heat exchange medium.

According to a preferred embodiment, the inner and/or outer surfaces of the pipes are corrugated. Thus, the kind of flow in the interior of the pipes and/or in the cavities can be adjusted. If, for example, the outer surfaces of the pipes are corrugated, a turbulent flow of the medium in the cavities will result. Such a turbulent flow of the medium in the cavities is particularly advantageous when a gaseous medium circulates in the cavities. In order to increase the cooling performance of the arrangement, a liquid, e.g. water, can be admixed to the gaseous medium circulating in the cavities, whereby the water evaporates and condenses again several times along its path between hot casing and cold pipes; thus, the vaporization and condensation enthalpy of the water can be used repeatedly.

BRIEF DESCRIPTION OF THE DRAWINGS

In the following, a preferred embodiment of the invention will be described, with reference to the accompanying drawings, in which.

DETAILED DESCRIPTION OF A PREFERRED EMBODIMENT

Figure 1:
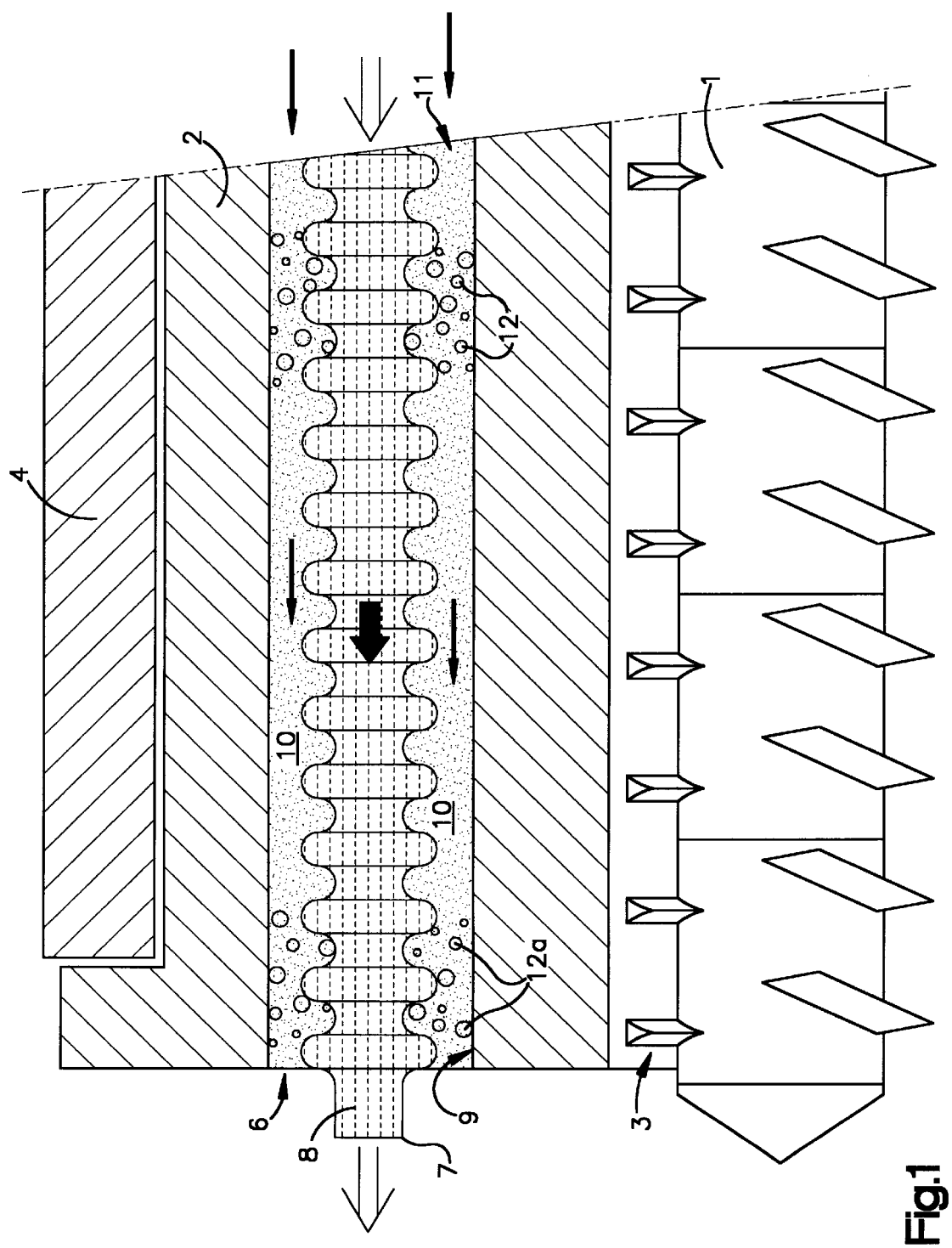
FIG. 1 shows a schematic partial sectional view of a casing of a mixing and kneading machine.

In the following, the basic principle of the method according to the invention shall be further explained, whereby reference is made to FIG. 1 showing a schematic partial sectional view of a casing 2 of a mixing and kneading machine. The casing 2 of the mixing and kneading machine is provided with a processing chamber 3 and with a plurality of cooling channels 6. The cooling channels 6 may be realized by drilling, for example. In the cooling channels 6, pipes 7 in the form of corrugated hoses are received, but only one channel 6 and one pipe 7 are shown in FIG. 1. Between the pipe 7 and the walls of the channel 6, there remains a cavity 10. A working member 1 for mixing and kneading the material received in the processing chamber 3 is received in the processing chamber 3. An electrically operated heating device 4 for heating the casing 2 and the processing chamber 3, respectively, is provided on the outer surface of the casing 2.

For cooling the casing 2, a heat exchange medium 11 is conveyed through the cavity 10, while a liquid 8, preferably water, is circulated through the pipe 7. To vary the amount of heat exchanged per time period between the channel walls 9 and the casing 2, respectively, and the pipe 7 and the liquid 8 circulating therein, respectively, a number of possibilities to choose the heat exchange medium 11 exists:

1. Moving air is conveyed through the cavity 10;
2. Moving air, mixed at intervals with a liquid, is conveyed through the cavity 10;
3. Moving air, continuously mixed with a liquid, is conveyed through the cavity 10; and
4. A liquid is conveyed through the cavity 10.

Moreover, there are further possibilities to vary the heat exchange ratio between the pipe 7 and the channel walls 9 and between the liquid circulating in the pipe 7 and the channel walls 9, respectively; in the course of each of the above mentioned operating possibilities 1. to 4., the velocity of the heat exchange medium 11 circulating in the cavity 10 may be varied, for example.

In case of the second of the above described operating states, there are even further possibilities to influence the heat exchange ratio. Particularly, the duration of admixing a liquid to the moving air and/or the time between two mixing intervals and/or the amount of the admixed liquid, which is shown as drops 12 in FIG. 1, may be varied.

Another possibility to vary the heat exchange ratio between the pipe 7 and the channel walls 9 may be realized by selecting a heat exchange medium 11 having a desired thermal conductivity. Moreover, the preliminary temperature of the liquid 8 circulating in the pipe 7 and its flow velocity may be varied depending on the demands.

Furthermore, the heat exchange ratio may be varied by designing the shape of the outer and, if necessary, the inner surfaces of the pipe 7, as not only the total area of the surface but also the flow characteristic of the medium circulating in the pipe 7 and in the cavity 10, respectively, are dependent of the shape of the surfaces of the pipe 7. Finally, the heat exchange ratio can be influenced by selecting the absolute or relative dimensions of the channels 6 and the pipes 7, particularly their diameters.

With such an arrangement, a continuous heat exchange takes place between the medium 11 circulating in the cavity 10 and the liquid 8 circulating in the pipe 7. Thus, for instance a gaseous medium 11 circulating in the cavity 10 rapidly reaches a certain temperature, amounting to a mean value between the temperatures of the casing 2 and the pipe 7, respectively. The temperature of such a gaseous medium 11 circulating in the cavity 10 changes but insignificantly during its path of circulation through the cavity 10, with the result that the casing 2 is going to be cooled in an uniform manner.

Figure 2:
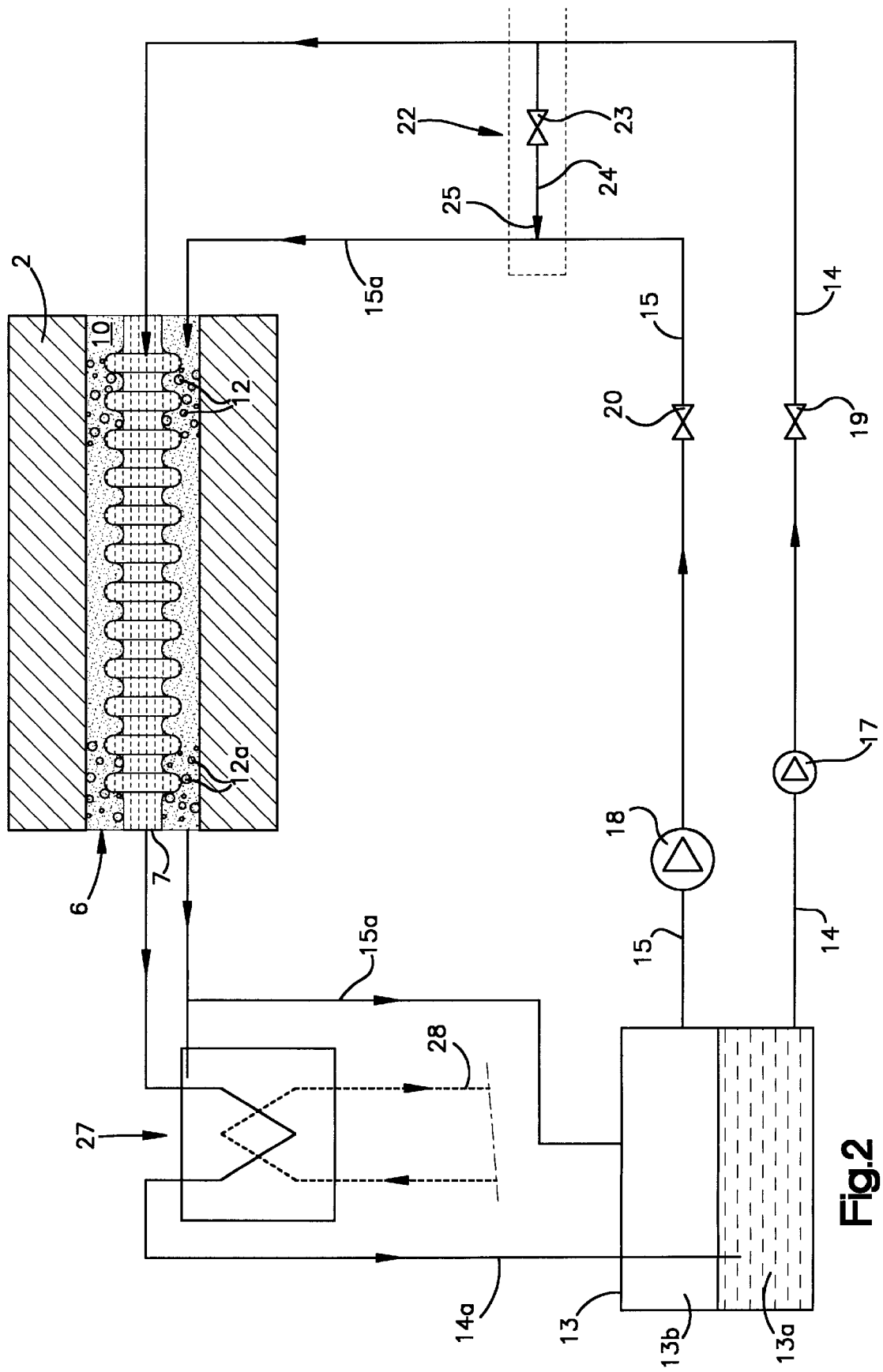
FIG. 2 shows a schematic diagram of an arrangement for cooling a mixing and kneading machine.

FIG. 2 shows a schematic illustration of the essential parts and elements of an arrangement for cooling a machine casing 2. Corresponding elements have reference numerals identical to those shown in FIG. 1. Besides the casing 2 to be cooled, a storage tank 13, two pipes 14, 15, two conveyer devices 17, 18, two non-return valves 19, 20, a liquid admixing device 22 and a heat exchanger 27 are shown in this illustration.

The storage tank 13 is adapted to contain a liquid cooling medium 13a, in the present embodiment e.g. water. The two pipes 14, 15 lead away from the storage tank 13. The lower pipe 14 connects the lower portion of the storage tank 13 to the pipe 7 received in a cooling channel 6 of the casing 2 for supplying cooling water 13a to the pipe 7. The upper pipe 15 connects an upper portion of the storage tank 13, containing air 13b, to the cavity 10 of the casing 2. A cooling water pipe 14a as well as a gas pipe 15b run from the casing 2 back to the storage tank 13. For conveying the respective medium 13a and 13b, respectively, contained in the storage tank 13, both pipes 14, 15 are provided with a conveyor device 17 and 18, respectively. The liquid pipe 14 is provided with a conveyor pump 17 and the gas pipe 15 is provided with a fan 18. Each of the pipes 14, 15 is provided with a non-return valve 19, 20.

The device 22 is provided for feeding a liquid to the pipe 15a; said liquid is branched off the pipe 14. For this purpose, the liquid admixing device 22 comprises a valve 23, a connection pipe 24 and a nozzle 25.

For cooling the liquid circulating in the pipe 7, the outlet of the pipe 7 is connected to a heat exchanger 27 and the latter one is connected to a cooling water pipe 28.

The mode of operation of such an arrangement will be described hereinafter:

Under normal cooling conditions, water circulates in the pipe 7 and air circulates in the cavity 10. The water 13a is taken out of the tank 13 and conveyed by the pump 17 through the open valve 19 to the pipe 7. The air 13b sucked out of the tank 13 is blown by means of the fan 18 through the open valve 20 into the cavity 10. The cooling water 13a, after having left the pipe 7 provided in the casing 2, is going to be cooled in the heat exchanger 27 and flows back to the tank 13. In this mode of operation, the valve 23 is closed.

If a higher cooling performance is required, the air 13b blown via pipe 15a into the cavity 10 is mixed in intervals with water by means of the admixing device 22. For this purpose, the valve 23 is periodically opened for a short time. If the valve 23 is open, liquid flows from the pipe 14 via pipe 24 and nozzle 25 into pipe 15a. The liquid entrained with the moving air is schematically illustrated in the shape of drops 12, 12a inside the casing 2. The corrugated surface of the pipe 7 favors a turbulent flow both in the cavity 10 and in the pipe 7. The liquid 12, 12a admixed to the air vaporizes and condenses several times during its path along the pipe 7, whereby the corrugation of the pipe 7 favors the uniform drip-off of the condensate.

If a gaseous medium flows through the cavity 10, the heat exchange between the pipe 7 and the casing 2 may be affected by varying the length of the time period during which liquid is admixed to the gaseous medium, or by varying the time elapsing between two admixing intervals, or by varying both of the above parameters.

In a third cooling mode, the cavity 10 of the casing 2 is filled with water. For this purpose, the fan 18 is switched off and the valve 20 is closed. Thereafter, water is continuously fed through the open valve 23 to the pipe 15a by means of the admixing device 22. Under these conditions, the casing 2 is going to be cooled maximally.

Figure 3A:
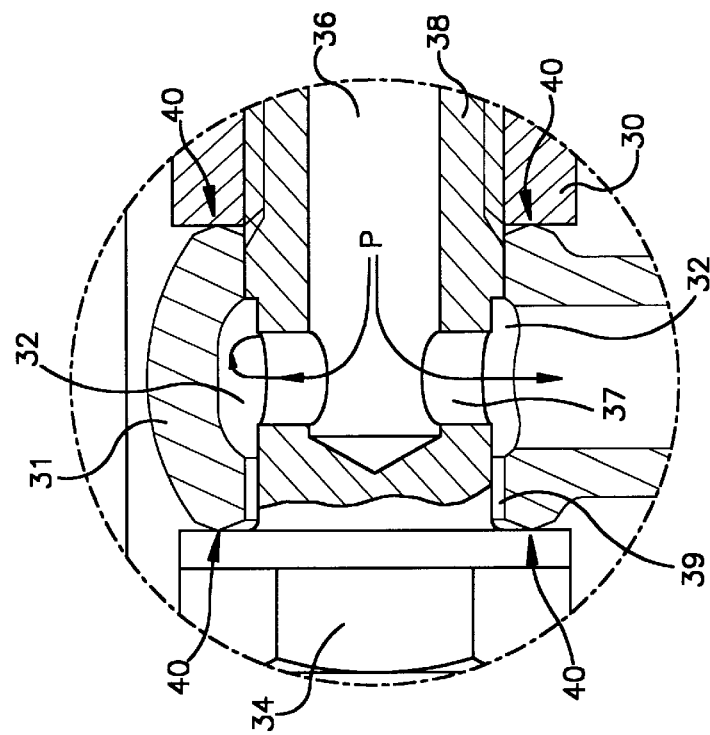
FIG. 3a shows an enlarged portion of FIG. 3.
Figure 3:
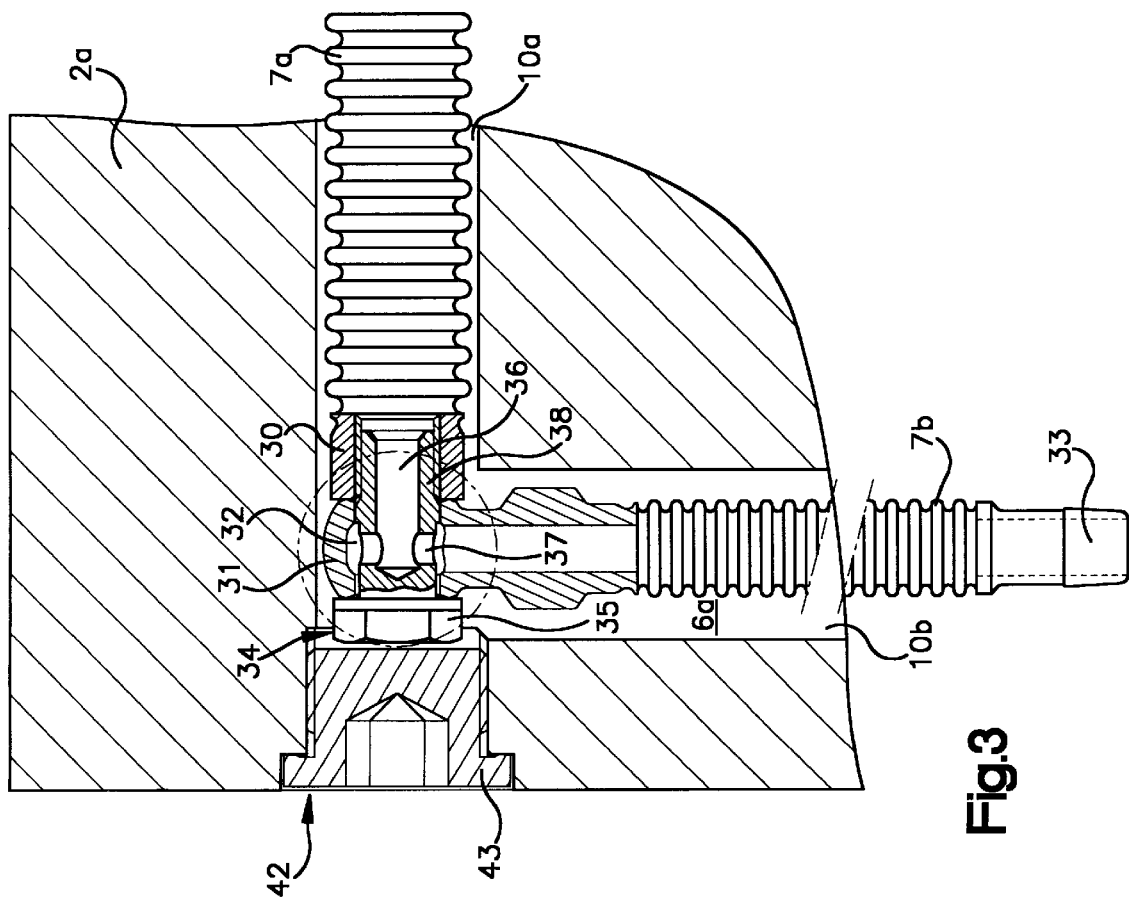
FIG. 3 shows a more detailed sectional view of a portion of an angled channel together with pipes received therein.

FIG. 3 shows a detailed view of a casing 2a, and FIG. 3a shows an enlarged portion of FIG. 3. In this embodiment, the cooling channels provided in the casing 2a are angled by 90°; it is understood that FIG. 3 shows only one single cooling channel 6a having two portions extending at an angle of 90° relative to each other. In order to enable the pipes 7a, 7b received in the channels to follow such angled configuration, connecting elements are provided which allow a connection of the two pipes 7a, 7b under an angle of 90°. Particularly, each of the pipes 7a, 7b is provided with a connecting member 30, 31 at its respective end. In the present embodiment of the invention, the horizontally extending pipe 7a comprises a threaded connecting member 30 at one end. At the upper end of the vertically extending pipe 7b, an annular nipple 31 having an annular groove 32 at the inner side is provided. To connect the pipes 7a, 7b to each other, a screw member in the kind of a hollow screw 34 is provided which has a head portion 35 and an adjacent shaft portion 38. At its front end, the shaft portion 38 is provided with an external screw thread. Moreover, the shaft portion 38 comprises a longitudinal bore 36 which is crossed by a transversal bore 37. The transversal bore 37 communicates with the annular groove 32 of the annular nipple 31 such that both pipes 7a, 7b are hydraulically connected to each other and the liquid may flow through the threaded connecting member 30, the annular nipple 31 and the hollow screw 34 from one pipe 7a to the other pipe 7 as indicated by the arrows P. To sealingly interconnect the pipes 7a and 7b without the use of a particular sealing member, the annular nipple 31 is provided with two sealing edges 40 (FIG. 3a) which are, together with the counterpart, plastically deformed under the influence of the tightening pressure of the hollow screw 34. Thereby, it is made sure that the threaded connecting member 30 is sealingly pressed against the annular nipple 31 and that the annular nipple 31 is sealingly pressed against the hollow screw 34; thus, no further sealing means whatsoever are required. At its lower end, the vertically extending pipe 7a is provided with a hose stem 33 for being connected to a corresponding tube member (not shown).

For threading together the two pipes 7a, 7b located in the channel 6a, the horizontally extending portion of the channel 6a is provided with a passage bore 42 leading to the exterior of the casing 2a. That passage bore 42 will be sealed by means of a plug member 43 after the two pipes 7a, 7b have been threaded together.

The advantages of the foregoing described arrangement may be summarized as follows:

The cooling performance is variable within a wide range;

Use of cooling media which are not harmful to the environment (no heat exchange oils are required);

Safe mode of operation as the used cooling medium (water) may circulate generally under atmospheric conditions without over-pressure even if the casing reaches a high temperature;

Efficient operation; multiple use of the vaporization and condensation enthalpy during a mixed mode of operation using water and air;

The corrugated surface of the pipe ensures a turbulent flow both in the interior of the cooling liquid pipes and in the cavities between the pipes and the casing, thereby providing for a good heat exchange even if the medium flows slowly;

Uniform cooling of the casing;

The casings may be manufactured as standardized units. Existing casings with a conventional oil or water cooling may be upgraded to the novel system according to the invention.

Finally, it must be emphasized that the method according to the invention may generally be used for the thermal treatment of any body by means of a heat exchange medium. The heat exchange process follows the laws of thermodynamics. On the basis of the foregoing described principle, a practice oriented method and an arrangement are proposed to vary the heat current (heat exchange per time period). The cavity constitutes a particular region between the body to be cooled or heated and the heat exchange medium in which the limiting quantities of heat exchange, namely the thermal conductivity and the thermal transfer resistance, may be varied. This may be realized by selecting different media and their combinations, as well as by selecting an appropriate flow rate of these media. Moreover, the shape and the design of the arrangement offers corresponding possibilities of influence.

It has to be mentioned that the herein before described method and the corresponding arrangement my be used for cooling generally any object and each kind of body, respectively. Even if the embodiment and the method particularly described herein before refers to the cooling of a machine casing, it has to be emphasized that the method and the arrangement may be used not only for cooling but also for heating each kind of objects. Moreover, a combined mode of operation is possible in which the arrangement and the method, respectively, may be used for alternatingly heating and cooling a particular object, as may be required in a particular application.

What is claimed is:

1. A method for cooling or heating a machine casing, said machine casing comprising:
    a process chamber enclosed by said casing and adapted to receive a material to be treated therein, whereby a desired temperature of said material to be treated in said process chamber has to be kept essentially constant;
    a plurality of channel means located in the interior of said casing, each channel means having channel wall means;
    a plurality of pipe means, each of said pipe means having surface means and adapted to receive a liquid cooling or heating medium circulating therethrough;
    each pipe of said plurality of pipe means being received in one of said channel means of said plurality of channel means such that at most a portion of said surface means of each of said pipes is in thermal contact with said channel wall means of the associated channel means;
    a cavity means provided between each of said channel wall means and the pipe surface means of said pipe means located in that particular channel means;
    the method comprising the steps of:
        providing at least one heat exchange medium;
        conveying said heat exchange medium through said cavity means to exchange heat between said pipe means and said channel wall means; and
        varying the amount of heat energy exchanged per time period between said pipe means and said channel wall means
            by replacing said heat exchange medium by a different heat exchange medium; and/or
            by changing the composition of said heat exchange medium; and/or
            by adjusting the flow velocity of said heat exchange medium
        to keep the temperature of said material to be treated in said process chamber essentially constant.

2. The method as set forth in claim 1, in which said heat exchange medium conveyed through said cavity means between said channel wall means and said pipe surface means is a gaseous medium.

3. The method as set forth in claim 2, in which said step of varying the amount of heat energy exchanged per time period between said pipe means and said channel wall means comprises the step of admixing a liquid to said gaseous medium.

4. The method as set forth in claim 3, in which said liquid is periodically admixed to said gaseous medium.

5. The method as set forth in claim 3, in which said liquid admixed to said gaseous medium is branched off the liquid circulating through each pipe of said plurality of pipe means received in said channel means provided in said casing.

6. The method as set forth in claim 3, wherein said gaseous medium is air and said liquid is water.

7. The method as set forth in claim 1, in which said step of varying the amount of heat energy exchanged per time period between said pipe means and said channel wall means comprises the step of increasing the amount of heat energy exchanged per time period by circulating a liquid through said cavity means.

8. The method as set forth in claim 7, in which said liquid circulated through said cavity means is water.

9. The method as set forth in claim 7, in which said liquid circulated through said cavity means is branched off the liquid circulating through each pipe of said plurality of pipe means received in said channel means provided in said casing.

10. The method as set forth in claim 1, further providing a liquid cooling or heating medium; circulating said liquid medium through each pipe of said plurality of pipe means, in which said step of varying the amount of heat energy exchanged per time period between said pipe means and said channel wall means comprises the step of increasing the amount of heat energy exchanged per time period by providing a turbulent flow of the medium circulating in each pipe of said plurality of pipes.

11. The method as set forth in claim 1, further providing a liquid cooling or heating medium; circulating said liquid medium through each pipe of said plurality of pipe means, in which said step of varying the amount of heat energy exchanged per time period between said pipe means and said channel wall means comprises the step of increasing the amount of heat energy exchanged per time period by providing a turbulent flow of said medium circulating in said cavity means.

12. The method as set forth in claim 1, further providing a liquid cooling or heating medium; circulating said liquid medium through each pipe of said plurality of pipe means, in which said step of varying the amount of heat energy exchanged per time period between said pipe means and said channel wall means comprises the step of varying the temperature of said medium circulating in each pipe of said plurality of pipes.

13. The method as set forth in claim 1, further providing a liquid cooling or heating medium; circulating said liquid medium through each pipe of said plurality of pipe means, in which said step of varying the amount of heat energy exchanged per time period between said pipe means and said channel wall means comprises the step of varying the flow speed of said medium circulating in each pipe of said plurality of pipes.

14. The method as set forth in claim 1, further providing a liquid cooling or heating medium; circulating said liquid medium through each pipe of said plurality of pipe means, further comprising the step of conveying said medium circulating in each pipe of said plurality of pipes through a heat exchanging means to increase or decrease the temperature of said medium.

15. An arrangement for cooling or heating a machine casing having a process chamber enclosed by said casing and adapted to receive a material to be treated therein, whereby a desired temperature of said material to be treated in said process chamber has to be kept essentially constant, said arrangement comprising:

a plurality of channel means located in the interior of said casing, each channel means having channel wall means;

a plurality of pipe means, each of said pipe means having surface means and adapted to receive a liquid cooling or heating medium circulating therethrough;

each pipe of said plurality of pipe means being received in one of said channel means of said plurality of channel means such that at most a portion of said surface means of each of said pipes is in thermal contact with said channel wall means of the associated channel means;

a cavity means provided between each of said channel wall means and the pipe surface means of said pipe means located in that particular channel means;

means for conveying said heat exchange medium through said cavity means to exchange heat between said pipe means and said channel wall means; and means for varying the amount of heat energy exchanged per time period between said pipe means and said channel wall means by said heat exchange medium.

16. The arrangement as set forth in claim 15, in which the outer surface of each pipe of said plurality of pipe means is corrugated.

17. The arrangement as set forth in claim 15, in which the inner surface of each pipe of said plurality of pipe means is corrugated.

18. The arrangement as set forth in claim 15, in which the inner and/or outer surfaces of each pipe of said plurality of pipe means are smooth.

19. The arrangement as set forth in claim 15, in which said means for conveying said heat exchange medium through said cavity means includes a first means for blowing a moving gas through said cavity means and a second means for admixing a liquid medium to said gas or for conveying a liquid medium through said cavity means.

20. The arrangement as set forth in claim 19, in which said second means comprises an apparatus for branching off a liquid from a fluid current circulating through said pipe means.

21. The arrangement as set forth in claim 20, further comprising control means for periodically operating said apparatus for branching off said liquid from said fluid current.

22. The arrangement as set forth in claim 15, in which said plurality of pipe means is connected to a heat exchanging means.

23. The arrangement as set forth in claim 15, in which at least some pipes of said plurality of pipes are provided at their ends with a connecting member for connecting a particular pipe to another pipe.

24. The arrangement as set forth in claim 23, in which said connecting members are constituted by threaded hollow sleeve members.

25. The arrangement as set forth in claim 23, in which said connecting members are designed as annular nipples having a bore extending perpendicularly to the longitudinal axis of the pipe to which it is fixed, said annular nipple having an annular groove at its inner side.

26. The arrangement as set forth in claim 25, further comprising screw means provided with a shaft portion having a first longitudinally extending bore therein, said screw means further having a second transverse bore extending radially from one side of said shaft portion to the other side of said shaft portion and radially opening into said first longitudinally extending bore.

27. The arrangement as set forth in claim 26, in which said annular nipple is provided with sealing edges which are plastically deformed together with the counterpart under the influence of the tightening pressure of said screw means.

28. The arrangement as set forth in claim 27, in which said screw means each comprises a head portion having an annular surface facing said shaft portion, the distance between said annular surface and the center of the longitudinal axis of said second transverse bore being substantially equal to the distance between said sealing edge of said annular nipple and an outer surface limiting the transverse bore of the annular nipple or the center of the annular groove provided therein, respectively, such that said transverse bore of said screw means communicates with said annular groove of said annular nipple when said pipes are connected to each other.

29. The arrangement as set forth in claim 15, in which each pipe of said plurality of pipe means is flexible.

30. An arrangement for cooling the casing of a mixing and kneading apparatus having a process chamber located in the interior of said casing and adapted to receive a material to be mixed and kneaded therein, whereby the temperature of said material to be mixed and kneaded in said process chamber has to be kept essentially constant, said arrangement comprising:

- a plurality of channel means located in the interior of said casing, each channel means having channel wall means;
- a plurality of pipe means, each of said pipe means having surface means and adapted to receive a liquid cooling or heating medium circulating therethrough;
- each pipe of said plurality of pipe means being received in one of said channel means of said plurality of channel means such that at most a portion of said surface means of each of said pipes is in thermal contact with said channel wall means of the associated channel means;
- a cavity means provided between each of said channel wall means and the pipe surface means of said pipe means located in that particular channel means;
- means for conveying said heat exchange medium through said cavity means to exchange heat between said pipe means and said channel wall means; and
- means for varying the amount of heat energy exchanged per time period between said pipe means and said channel wall means by said heat exchange medium.

* * * * *